United States Patent
O'Brien et al.

(10) Patent No.: US 12,205,729 B2
(45) Date of Patent: Jan. 21, 2025

(54) SENSOR ASSEMBLIES AND NUCLEAR REACTOR SYSTEMS COMPRISING DOPED SOLID-STATE LASING MEDIA FOR USE IN DETERMINING AN OPERATING CHARACTERISTIC OF A NUCLEAR REACTOR, AND RELATED METHODS

(71) Applicant: Battelle Energy Alliance, LLC, Idaho Falls, ID (US)

(72) Inventors: Robert C. O'Brien, Idaho Falls, ID (US); Allen A. Beasley, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 112 days.

(21) Appl. No.: 17/758,395

(22) PCT Filed: Jan. 5, 2021

(86) PCT No.: PCT/US2021/012151
§ 371 (c)(1),
(2) Date: Jul. 5, 2022

(87) PCT Pub. No.: WO2021/141882
PCT Pub. Date: Jul. 15, 2021

(65) Prior Publication Data
US 2023/0023187 A1 Jan. 26, 2023

Related U.S. Application Data
(60) Provisional application No. 62/957,583, filed on Jan. 6, 2020.

(51) Int. Cl.
*G21C 17/108* (2006.01)
*G21D 3/00* (2006.01)

(52) U.S. Cl.
CPC ......... *G21C 17/108* (2013.01); *G21D 3/001* (2013.01)

(58) Field of Classification Search
CPC .................. G21C 17/108; G21D 3/001
(Continued)

(56) References Cited

U.S. PATENT DOCUMENTS 3,952,263 A * 4/1976 McArthur ........... H01S 3/09
 359/345
3,967,211 A 6/1976 Itzkan et al.
(Continued)

FOREIGN PATENT DOCUMENTS

CN 107393616 A 11/2017
JP 2002-138899 A 5/2002
(Continued)

OTHER PUBLICATIONS

Ferdinand et al., Optical Fiber Sensors to Improve the Safety of Nuclear Power Plants; (https://www.researchgate.nex/publication/269324010); Dec. 10, 2014; 8 pages.
(Continued)

*Primary Examiner* — Jack W Keith
*Assistant Examiner* — Daniel Wasil
(74) *Attorney, Agent, or Firm* — TraskBritt (57) ABSTRACT

A sensor assembly for determining an operating characteristic of a nuclear reactor. The sensor assembly includes a solid-state lasing media and an optical fiber. The solid-state lasing media is doped with a fissile species. The solid-state lasing media is disposable within a core of the nuclear reactor and is configured to generate laser light. An output of the laser light is based at least in part by the fissile species. The optical fiber is operably coupled to the solid-state lasing media and configured to receive the laser light generated by the solid-state lasing media. The optical fiber is configured (Continued)

to extend out of the core of the nuclear reactor to a control system of the nuclear reactor.

21 Claims, 4 Drawing Sheets (58) Field of Classification Search
USPC .......................................................... 376/254
See application file for complete search history.

(56) References Cited

U.S. PATENT DOCUMENTS

| | | | |
|---|---|---|---|
| 4,160,956 | A | 7/1979 | Fader |
| 4,971,749 | A | 11/1990 | Nakamura et al. |
| 5,114,661 | A | 5/1992 | Prelas |
| 10,504,033 | B1 | 12/2019 | King et al. |
| 2003/0026566 | A1* | 2/2003 | Diep ................ G02B 6/02266 385/124 |
| 2016/0062009 | A1 | 3/2016 | Wach |

FOREIGN PATENT DOCUMENTS

| | | |
|---|---|---|
| JP | 2006-194449 A | 7/2006 |
| JP | 2010-156490 A | 7/2010 |
| WO | 2014/022635 A1 | 2/2014 |

OTHER PUBLICATIONS

International Search Report for International Application No. PCT/US2021/12151, mailed May 24, 2021, Year, 3 pages.

International Written Opinion for International Application No. PCT/US2021/12151, mailed May 24, 2021, 7 pages.

Jeff Hecht; Short History of Laser Development; Optical Engineering; 49(9); (/journals/optical-engineering/volume-49/issue-9; Sep. 1, 2010; 31 pages.

Nuclear Reactor Lasers: From Fission to Photon; (https://www.toughsf.blogspot.com/2019/04/nuclear-reactor-lasers-from-fission-to.html); Apr. 20, 2019; 50 pages.

Union of Concerned Scientists "How Nuclear Power Works"; (https://www.ucsusa.org/resources/how-nuclear-pwer-works); Jan. 29, 2014; 9 pages.

European Extended Search Report and Opinion for European Application No. 21738363.7, dated Feb. 16, 2024, 10 pages.

Japanese Notice of Reasons for Refusal for Japanese Application No. 2022-541656, dated Jul. 10, 2023, 3 pages with English translation.

* cited by examiner

SENSOR ASSEMBLIES AND NUCLEAR REACTOR SYSTEMS COMPRISING DOPED SOLID-STATE LASING MEDIA FOR USE IN DETERMINING AN OPERATING CHARACTERISTIC OF A NUCLEAR REACTOR, AND RELATED METHODS

CROSS-REFERENCE TO RELATED APPLICATIONS

This application is a national phase entry under 35 U.S.C. § 371 of International Patent Application PCT/US2021/012151, filed Jan. 5, 2021, designating the United States of America and published as International Patent Publication WO 2021/141882 A1 on Jul. 15, 2021, which claims the benefit under Article 8 of the Patent Cooperation Treaty to U.S. Provisional Patent Application Ser. No. 62/957,583, filed Jan. 6, 2020, for "Solid State Nuclear Pumped Lasing Sensors for In Pile Reactor Power and Flux Measurement, Direct Energy Conversion, and Related Methods."

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates generally to sensor assemblies for determining power and radiation flux of nuclear reactors. In particular, this disclosure relates to nuclear reactor systems including sensor assemblies. The disclosure further relates to methods of determining operating characteristics of nuclear reactor systems utilizing sensor assemblies.

BACKGROUND

Measurement of nuclear reactor power is conventionally performed using instrumentation that, by necessity, must be housed outside of a reactor core, typically behind shielding. Since the instruments are outside of the reactor, only bulk operating power can be inferred. As a result, the inferred bulk operating power provide very limited, to no, spatial resolution. In order to infer reactor power at relatively large scale reactors, multiple instruments are typically used to cover the range of powers over which the reactor operates due to source scale instrument saturation at high power and minimum threshold powers for high power instrumentation. Accuracy is also impaired due to spectral shift and electronic/thermal drift and stability. More accurate measurements of flux and power can be determined classically via the use of flux and fission wires that must be processed chemically, or their activity can be counted using gamma scintillation detectors; however, both methods require several hours or days to process the information and, thus, cannot be used for real-time measurements.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

The illustrations presented herein are not actual views of any sensor assembly, nuclear reactor system, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Embodiments of the present disclosure include a sensor assembly that utilizes the excitation of atoms of a solid-state lasing media and/or crystal by neutron, gamma, beta, and fission fragments within a nuclear reactor core to generate laser light, which is transmitted out of a reactor core via an optical fiber. The laser light intensity is directly proportional to both a reactor power and flux of radiation within the nuclear reactor core. As a result, the reactor power and flux of radiation within the nuclear reactor core may be determined from the laser light. Additional embodiments of the present disclosure include utilizing multiple lasing media (with differing output wavelengths) that are doped within differing fissile species (e.g., uranium, plutonium, americium, californium, etc.) that couple to distinct radiation energy groups enables both reactor power and reactor energy spectrum (e.g., thermal spectrum and/or fast spectrum) to be determined. The sensor assemblies of the present disclosure may be distributed throughout a reactor core to determine a power/flux distribution in real time. The sensor assemblies of the present disclosure are passive in nature and do not require electrical power to be supplied to the sensor assembly and within the core. The optical fiber may extend to a detector and/or spectrometer for remote measurement of the power/flux distribution and conversion of the power/flux distribution to digital information.

Figure 1:
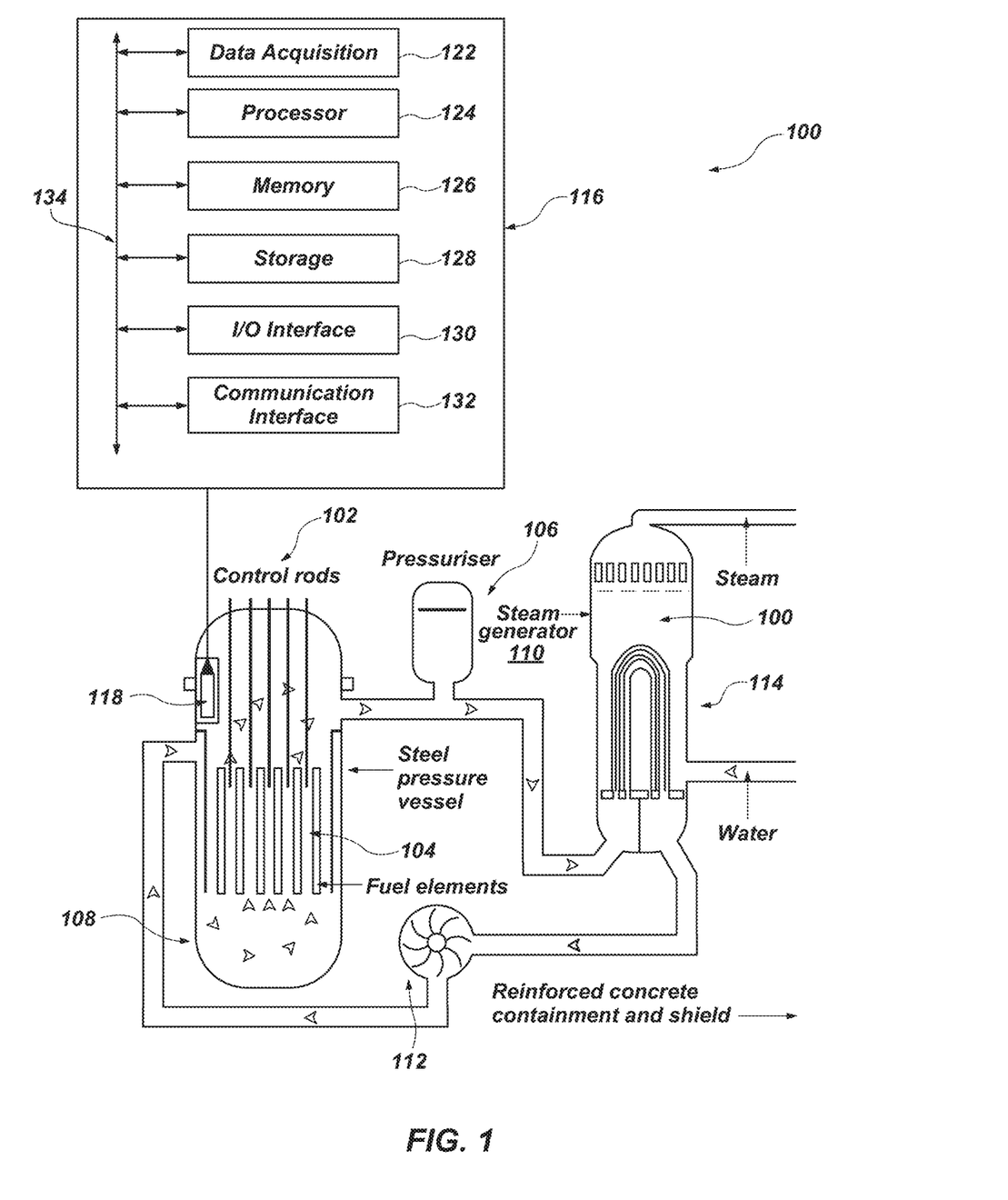
FIG. 1 illustrates a schematic diagram of a nuclear reactor system with a sensor assembly in accordance with one or more embodiments of the present disclosure.

FIG. 1 illustrates a nuclear reactor system 100 according to one or more embodiments of the present disclosure. The nuclear reactor system 100 may comprise control rods 102, fuel elements 104, a pressurizer 106, a reactor vessel 108, a steam generator 110, a reactor coolant pump 112, and a reactor coolant system 114. For example, the nuclear reactor system 100 may include a conventional pressurized water reactor (PWR). Furthermore, although the nuclear reactor system 100 is described herein as a PWR, the disclosure is not so limited, and the nuclear reactor system 100 may include a Magnox, an advanced gas-cooled, a boiling water reactor, a Canada Deuterium Uranium, or a graphite-moderated (e.g., RBMK) reactor system.

The nuclear reactor system 100 may further include a control system 116 and a sensor assembly 118. The sensor assembly 118 may be placed within reactor vessel 108 (e.g., the core) of the nuclear reactor system 100. The control system 116 may include a reactor control system for manual and autonomous reactor operations and may include a data acquisition system 122, a processor 124, a memory 126, a storage device 128, a user interface 130, and a communication interface 132, which may be communicatively coupled by way of a communication infrastructure 134. While one example of a computing device is shown in FIG. 1, the components illustrated in FIG. 1 are not intended to be limiting. Additional or alternative components may be used in other embodiments. Furthermore, in certain embodiments, the control system 116 may include fewer components than those shown in FIG. 1. Components of the control system 116 shown in FIG. 1 are described in additional detail below.

The sensor assembly 118 may include a solid-state lasing media, a casing, and at least one optical fiber. The solid-state lasing media may be disposed within the casing, and the at least one optical fiber may be optically coupled to the solid-state lasing media 136. The at least one optical fiber may also be coupled to the data acquisition system 122 of the control system 116. The sensor assembly 118 is described in further detail below in regard to FIGS. 2 and 3. As is described in greater detail herein, the nuclear reactor system 100 may utilize the excitation of atoms of the solid-state lasing media by neutron, gamma, beta, and fission fragments flux within the reactor core to generate laser light. The data acquisition system 122 in conjunction with other elements of the control system 116 may receive the laser light and may analyze the laser light to determine reactor power and flux of radiation of the reactor in real time.

Figure 2:
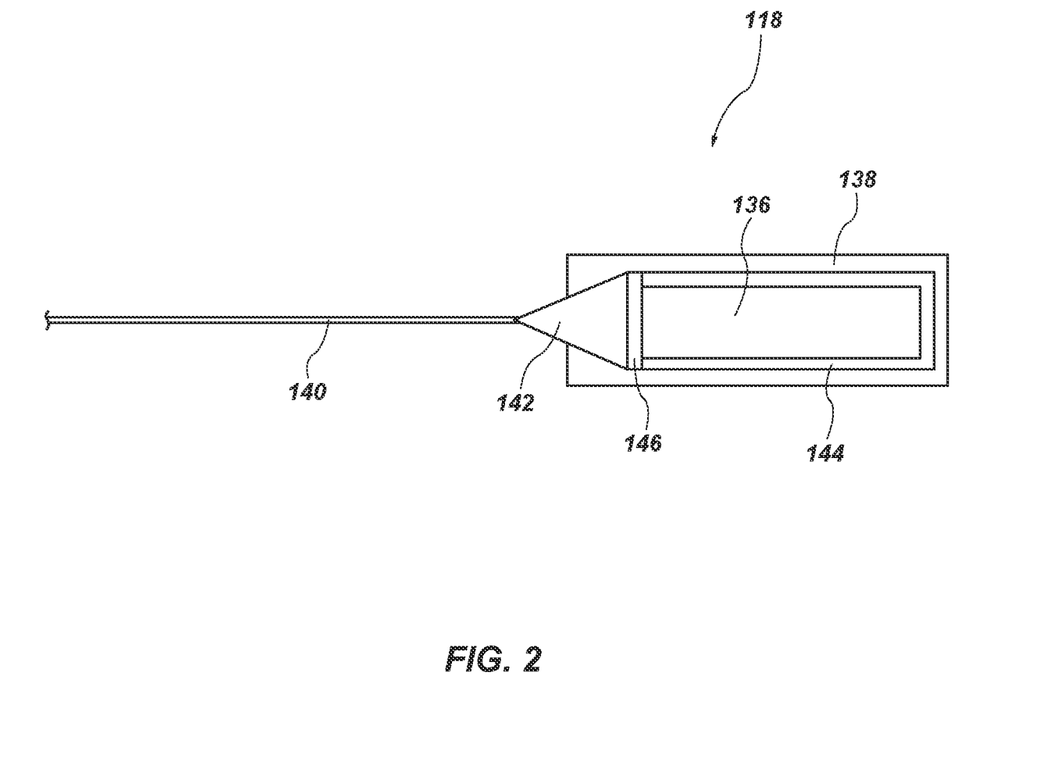
FIG. 2 shows schematic diagram of a sensor assembly according to one or more embodiments of the present disclosure.

FIG. 2 is a schematic representation of the sensor assembly 118 and the control system 116 of the nuclear reactor system 100 according to one or more embodiments of the present disclosure. In some embodiments, the sensor assembly 118 may include a solid-state lasing media 136, a casing 138, and at least one optical fiber 140, an interface portion 142, a two-way mirror coating 144, and a full-mirror coating 146. The full-mirror coating 146 may partially surround the solid-state lasing media 136, and the two-way mirror coating 144 may surround a remaining portion of the solid-state lasing media 136. The two-way mirror coating 144 may also be disposed between the solid-state lasing media 136 and the interface portion 142 operably coupling the solid-state lasing media 136 to the interface portion 142. The casing 138 may surround exposed portions of the full-mirror coating 146, the two-way mirror coating 144, and at least a portion of the interface portion 142. The at least one optical fiber 140 may be operably coupled to the interface portion 142 and may extend out of the reactor vessel 108 (FIG. 1) and to the control system 116.

In some embodiments, the solid-state lasing media 136 may have a cylindrical shape. However, the solid-state lasing media 136 may have any geometric shape. Furthermore, in one or more embodiments, the solid-state lasing media 136 may include a crystal. In some embodiments, the solid-state lasing media 136 may include an yttrium aluminum Garnet (YAG). In additional embodiments, the solid-state lasing media 136 may include synthetic emeralds, sapphires, or rubies.

In one or more embodiments, the solid-state lasing media 136 may be doped with a material to generate sensitivity to radiation (e.g., neutron sensitivity). For instance, the solid-state lasing media 136 may be doped with one or more of uranium, plutonium, americium, californium, or another fissile atomic species. In some embodiments, the solid-state lasing media 136 may be doped with a mixture of at least two of uranium, plutonium, americium, californium, or another fissile atomic species. As a result, the solid-state lasing media 136 may be directly pumped by fission fragments, internal neutron flux, gamma flux, beta flux, and/or external radiation flux emitted by the nuclear reactor system 100 (e.g., emitted within the reactor core). Accordingly, the solid-state lasing media 136 may be pumped by operation of the nuclear reactor system 100, and as a result, the sensor assembly 118 may be a passive sensor assembly 118 and may not require additional power inputs to operate and function. Furthermore, the doping material enables a color and wavelength of the output laser light to be controlled and selected. For instance, a dopant may be selected to adjust (e.g., select) a wavelength of an output laser light of the solid-state lasing media 136. In some embodiments, the dopants may be selected to keep an output laser light within an infrared range.

In some embodiments, the casing 138 may include a hermetic casing. In other words, the casing 138 is fluid-tight. In one or more embodiments, the casing 138 may include a ceramic material and/or a metal or metal alloy. In or more embodiments, the full-mirror coating 146 may include gold. In additional embodiments, the full-mirror coating 146 may include any other known material for forming mirror coatings. In some embodiments, the two-way mirror coating 144 may include a reciprocal mirror that is reflective on one side and transparent on the other. The two-way mirror may include a transparent material within a relatively thin layer of metal on one side. The metal may include aluminum and/or any other metal material.

In one or more embodiments, the interface portion 142 may have a general conical shape with the at least one optical fiber 140 being operably coupled to a lens of the interface portion (e.g., a lens at a tip of the conical shape) of the interface portion 142. In some embodiments, the interface portion 142 and/or the lens of the interface portion 142 may have a hemispherical, spherical, or any other shape. In one or more embodiments, the shape of the interface portion 142 and/or the lens of the interface portion 142 may be at least partially determined based on output beam requirements. In some embodiments, the lens may include one or more of optical glass, fused silica, and/or other suitable materials.

In some embodiments, the control system 116 and the data acquisition system 122 may include one or more of a power meter, an optical spectrometer, a multiplexer, silicon diode, or any other system/instrument for receiving light and determining power and flux of radiation from laser light or reading light and/or thermal energies.

As will be described in greater detail below, the sensor assembly 118 may be placed within the reactor vessel 108 (e.g., the reactor core) with the at least one optical fiber 140 extending our of the reactor vessel 108 and to the data acquisition system 122 of the control system 116. For instance, the sensor assemblies 118 may be disposed within an experiment compartment and/or within fuel channels of the reactor core. Furthermore, during operation, the solid-state lasing media 136 may be pumped by the nuclear reactor system 100. For instance, the solid-state lasing media 136 may be pumped by fission fragments, internal neutron flux, beta flux, gamma flux, and/or external radiation flux from the reactor core and operation to excited atoms of the solid-state lasing media 136 and/or dopants within the solid-state lasing media 136 to generate a laser light. Moreover, as noted above, because the solid-state lasing media 136 is pumped by the nuclear reactor system 100, the sensor assembly 118 does not require any external power and can be passive within the nuclear reactor system 100, which may increase a reliability of the sensor assembly 118 during use.

Furthermore, the sensor assembly 118 may direct the laser light to the at least one optical fiber 140 via the two-way mirror coating 144, the full-mirror coating 146, and the interface portion 142, and the at least one optical fiber 140 may transmit the laser light out of the reactor and to the control system 116 and the data acquisition system 122. The control system 116 and the data acquisition system 122 may receive the laser light and may analyze the received laser light via known methods to determine reactor power and flux of radiation (e.g., neutron, beta, gamma, and external radiation flux). For instance, the received laser light intensity may be directly proportional to the reactor power and/or may indicate the flux of radiation (e.g., neutron, beta, gamma, and external radiation flux). For example, gamma flux may be proportional to reactor power. As a result, reactor power and the flux of radiation (e.g., neutron, beta, gamma, and external radiation flux) can be determined in real time. Moreover, as will be discussed in further detail below, with multiple sensors, a ratio of thermal vs fast flux may be determined via information provided by the sensor assemblies. Furthermore, via the laser light provided by the sensor assembly 118, a power history of the nuclear reactor system 100 may be determined. In one or more embodiments, the control system 116 may convert the information indicated in the intensity and wavelength of the laser light into digital information. In some embodiments, the control system 116 may transmit the data acquired in receiving the laser light to remote computing systems for determining the reactor power and flux of radiation. Furthermore, in some embodiments, the received laser light and the associated analysis may be calibrated via information obtained from flux wires, which are known in the art.

In some embodiments, multiple sensor assemblies 118 may be disposed (e.g., distributed) throughout a reactor core. As a result, localized power and radiation flux can be determined within the nuclear reactor system 100. Furthermore, a power/flux distribution within the reactor core can be determined in real time.

As noted above, the control system 116 may include the reactor control system for manual and autonomous reactor operations. As a result, in some embodiments, the control system 116 may transmit determined reactor power and flux of radiation to the reactor control system, and the reactor control system may automatically adjust one or more operating parameters based on the determined reactor power and flux of radiation. In some embodiments, the control system 116 may be stand-alone with separate indications for laser output and reactor power. In additional embodiments, the control system 116 may form a part of a larger programmable logic controller (PLC) or distributed control system (DCS). Information received (e.g., derived) from the sensor assembly 118 may provide indications to operators of a reactor to inform the operators of reactor parameters. In additional embodiments, the information may be used by the control system 116 to provide automatic control or safety functions independent of operator actions.

Referring still to FIG. 2, in some embodiments, the sensor assembly 118 may have a first solid-state lasing media portion having a cylindrical shape, and a second solid-state lasing media portion having an annular shape and at least partially surrounding the first solid-state lasing media portion. Furthermore, the second solid-state lasing media portion may include a polycrystalline crystal and may act as a pump for the first solid-state lasing media portion having a cylindrical shape. As a result, the sensor assembly 118 with the second solid-state lasing media portion being pumped by the reactor, and the first solid-state lasing media portion being pumped with the second solid-state lasing media portion. Having two solid-state lasing media portions may facilitate generating laser light having relatively high power levels (e.g., megawatts of light).

Figure 3:
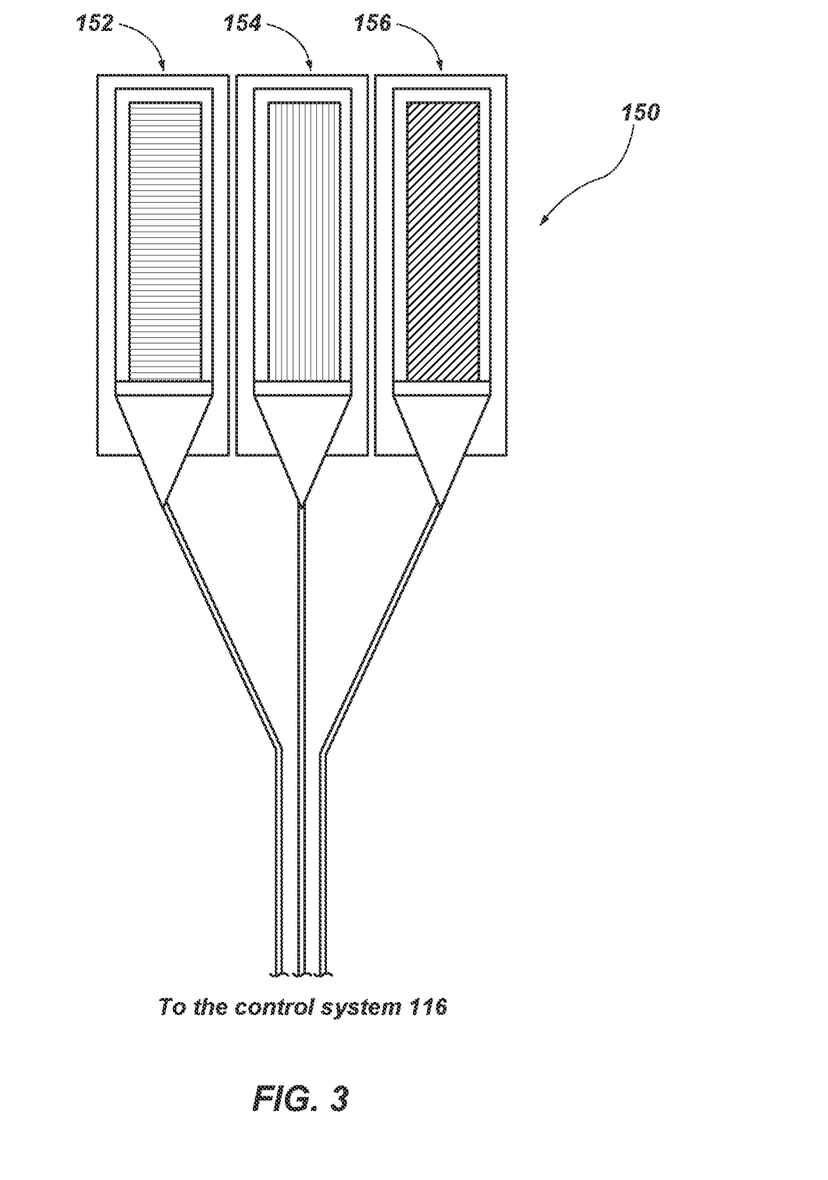
FIG. 3 shows schematic diagram of a set of sensor assemblies according to one or more embodiments of the present disclosure.

FIG. 3 is a schematic representation of a set of sensor assemblies 150 for determining both reactor power and an energy spectrum of a nuclear reactor system 100. For example, the set of sensor assemblies may include a first sensor assembly 152, a second sensor assembly 154, and a third sensor assembly 156. Furthermore, while only three sensor assemblies are depicted herein, the set of sensor assemblies 150 may include any number of sensor assemblies (e.g., four, five, ten, twenty, etc.). Moreover, a plurality of sets of sensor assemblies 150 may be distributed throughout a reactor core of a nuclear reactor system 100. Each of the sensor assemblies of the set of sensor assemblies 150 may include the elements of the sensor assembly 118 described above in regard to FIG. 2, and each may be operably coupled to the control system 116 of a nuclear reactor system 100.

In one or more embodiments, each sensor assembly 152, 154, 156 of the set of sensor assemblies 150 may be doped with a different dopant. As a result, utilizing the set of sensor assemblies 150, a control system 116 of a nuclear reactor system 100 may determine a reactor power from the first sensor assembly 152, a gamma flux from the second sensor assembly 154, and an internal neutron flux from the third sensor assembly 156. Accordingly, by including multiple sensor assemblies within the set of sensor assemblies 150 and doping each sensor assembly with a dopant selected to enable determination of portion (e.g., a part) of an energy spectrum (i.e., fission fragments, internal neutron flux, gamma flux, beta flux, and/or external radiation flux) of the nuclear reactor, the control system 116 of the nuclear reactor system 100 may determine both the reactor power and the energy spectrum of the nuclear reactor system 100. For example, by including multiple sensor assemblies within the set of sensor assemblies 150 and doping each sensor assembly with a dopant selected to enable determination of portion (e.g., a part) of an energy spectrum (i.e., fission fragments, internal neutron flux, gamma flux, beta flux, and/or external radiation flux) of the nuclear reactor, which type of energy pumps the sensor assembly may be selected, and a wavelength of the laser lights generated by the sensor assemblies of the set of sensor assemblies 150 may be selected. Furthermore, by distributing multiple sets of sensor assemblies 150 through a reactor core, the control system 116 of the nuclear reactor system 100 may determine a distribution of reactor power and a distribution of an energy spectrum of the nuclear reactor system 100.

Referring to FIGS. 1-3 together, in some embodiments, the sensor assemblies described herein may further be utilized as a direct energy output from the nuclear reactor system 100. For example, the solid-state lasing media described herein may be utilized to generate a laser light of relatively high energy (e.g., megawatts), and the laser light may be transmitted to another location for conversion from light to heat, electricity, or any other power source. For instance, the laser light may be converted through photovoltaics. Moreover, in some embodiments, the laser light may be transmitted over relatively long distances (e.g., kilometers, hundreds of kilometers, etc.). In view of the foregoing, the sensor assemblies and/or portions of the sensor assemblies described herein may be utilized to transmit an energy output of the nuclear reactor system 100 to a location remote to the nuclear reactor system 100.

Figure 4:
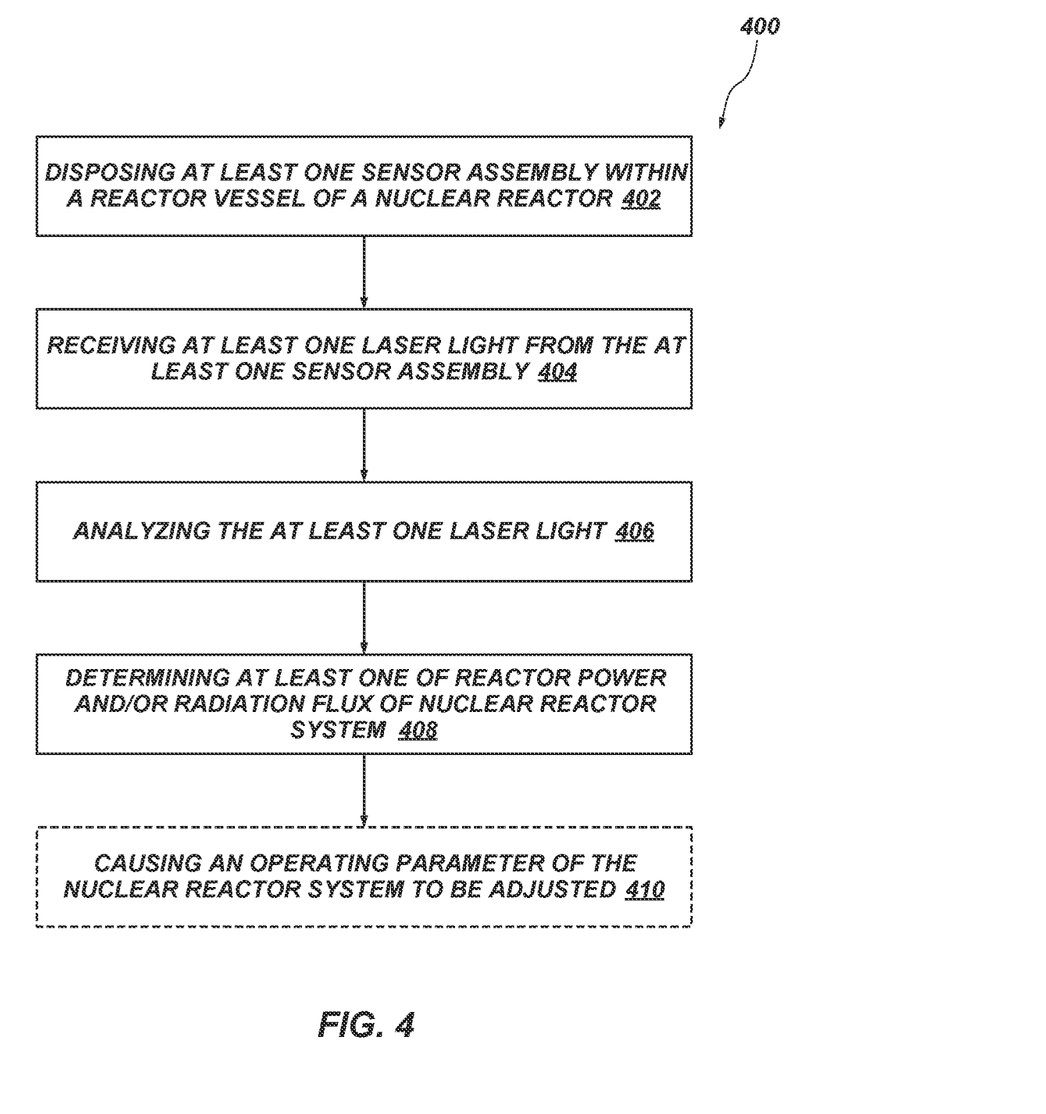
FIG. 4 shows a flow chart of a method of determining a characteristic of operation of a nuclear reactor system according to one or more embodiments of the present disclosure.

FIG. 4 shows a flow chart of a method 400 of determining a reactor power and/or flux of radiation from a nuclear reactor system 100 according to one or more embodiments of the present disclosure.

In some embodiments, the method 400 may include disposing at least one sensor assembly (e.g., sensor assembly 118) within a reactor vessel (e.g., a reactor core) of a nuclear reactor system 100, as shown in act 402 of FIG. 4. In one or more embodiments, disposing at least one sensor assembly within a reactor core may include disposing a set of sensor assemblies (e.g., the set of sensor assemblies 150) within the reactor core. Furthermore, in some embodiments, disposing at least one sensor assembly within a reactor core may include disposing (e.g., distributing) multiple sensor assemblies or sets of sensor assemblies throughout a reactor core.

In one or more embodiments, the method 400 may further include receiving at least one laser light from the at least one sensor assembly, as shown in act 404 of FIG. 4. For example, as discussed above, solid-state lasing media (e.g., solid-state lasing media 136) may be directly pumped by the nuclear reactor system. For instance, the solid-state lasing media may be pumped by fission fragments, internal neutron flux, beta flux, gamma flux, and/or external radiation flux from the reactor core and operation to excited atoms of the solid-state lasing media and/or dopants within the solid-state lasing media to generate a laser light. Furthermore, the at least one sensor assembly may direct the laser light to at least one optical fiber of the at least one sensor assembly via a two-way mirror coating, a full-mirror coating, and an interface portion, and the at least one optical fiber may transmit the laser light out of the reactor and to a control system (e.g., control system 116) and a data acquisition system (e.g., data acquisition system 122). In some embodiments, receiving the at least one laser light from the at least one sensor assembly may include receiving a plurality of laser lights from a plurality of sensor assemblies, each laser light of the plurality of laser lights representing one of a reactor power, a neutron flux, a beta flux, a gamma flux, and/or an external radiation flux.

Upon receiving the at least one laser light from the at least one sensor assembly, the method 400 may also include analyzing the at least one laser light, as shown in act 406 of FIG. 4. For example, analyzing the at least one laser light may include analyzing a wavelength and intensity of the at least one laser light via conventional methods to determine a power of the pump source (e.g., the reactor power, a neutron flux, a beta flux, a gamma flux, and/or an external radiation flux of the nuclear reactor system). In some embodiments, analyzing the at least one laser light may include analyzing a plurality of laser lights and/or a plurality of sets of laser lights.

Additionally, the method 400 may include determining at least one of a reactor power, a neutron flux, a beta flux, a gamma flux, and/or an external radiation flux of the nuclear reactor system, as shown in act 408 of FIG. 4. For instance, the reactor power, neutron flux, beta flux, gamma flux, and/or external radiation flux of the nuclear reactor system may be determined via the analyses of act 406 of FIG. 4. Furthermore, the reactor power, neutron flux, beta flux, gamma flux, and/or external radiation flux of the nuclear reactor system may be determined in real-time. In some embodiments, determining at least one of a reactor power, a neutron flux, a beta flux, a gamma flux, and/or an external radiation flux of the nuclear reactor system may include determining a distribution of a reactor power, a neutron flux, a beta flux, a gamma flux, and/or an external radiation flux. For instance, determining at least one of a reactor power, a neutron flux, a beta flux, a gamma flux, and/or an external radiation flux of the nuclear reactor system may include determining a distribution of an energy spectrum within the reactor core.

In one or more embodiments, the method 400 optionally include, in response to the determined at least one of a reactor power, a neutron flux, a beta flux, a gamma flux, and/or an external radiation flux, causing an operating parameter of the nuclear reactor system to be adjusted based on the determined at least one of a reactor power, a neutron flux, a beta flux, a gamma flux, and/or an external radiation flux, as shown in act 410 of FIG. 4.

Referring to FIGS. 1-4 together, the sensor assembly of the present disclosure may provide several advantages. For example, the sensor assembly does not require external power (i.e., the sensor assembly is passive), and thus, does not require any additional electronics to be disposed within the nuclear reactor. Accordingly, the sensor assembly provides an improved reliability relative to assemblies that include radiation susceptible electronics. As a result, the sensor assembly does not require shielding and can be disposed directly into the reactor core in comparison to conventional power determination systems.

Furthermore, the sensor assembly of the present disclosure may provide direct in-pile measurement of local reactor power and radiation flux/spectrum. Moreover, as noted above, the sensor assembly may be integrated into reactor control systems for both manual operations and for autonomous reactor operation, while providing real time information to the reactor control systems. For instance, the sensor assemblies may provide information immediately. Additionally, due to the lack of electronics and the materials involved with the sensor assembly, the sensor assembly may endure significantly high radiation fields and may have a relatively long life cycle. Also, due to the single optical fiber leading out of the nuclear reactor, the sensor assembly of the present disclosure provides a relatively simple system for installing and distributing throughout a nuclear reactor. Likewise, the simplicity of the sensor assembly reduces points of potential failure and increases durability and reliability sensor assembly. The simplicity of the sensor assembly also reduces a cost of installation and operations in comparison to conventional power determination systems. Additionally, the sensor assembly may be relatively small in size and may provide a highly suitable solution for power determination in micro-nuclear reactor operations and system. Furthermore, the sensor assembly of the present disclosure is readily application to space power and nuclear thermal propulsion reactor markets.

Referring again to FIG. 1 and the control system 116 of FIG. 1, the data acquisition system 122 may receive signals from the sensor assembly 118 and may include, or have associated therewith, analog to digital conversion circuitry to convert the analog signals from the optical fiber of the sensor assembly and the various sensors into digital numeric values that can be manipulated and/or analyzed by the control system 116 (e.g., the processor 124 and/or the data acquisition system 122 of the control system 116). The data acquisition system 122 may further include one or more software programs developed using various general purpose programming languages such as Assembly, BASIC, C, C++, C#, Fortran, Java, LabVIEW, Lisp, Pascal, etc. As a non-limiting example, the control system 116 may include any data acquisition system known in the art.

In one or more embodiments, the processor 124 includes hardware for executing instructions, such as those making up a computer program. As an example and not by way of limitation, to execute instructions, the processor 124 may retrieve (or fetch) the instructions from an internal register, an internal cache, the memory 126, or the storage device 128 and decode and execute them. In one or more embodiments, the processor 124 may include one or more internal caches for data, instructions, or addresses. As an example and not by way of limitation, the processor 124 may include one or more instruction caches, one or more data caches, and one or more translation lookaside buffers (TLBs). Instructions in the instruction caches may be copies of instructions in the memory 126 or the storage device 128.

The memory 126 may be used for storing data, metadata, and programs for execution by the processor(s). The memory 126 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 126 may be internal or distributed memory.

The storage device 128 includes storage for storing data or instructions. As an example and not by way of limitation, storage device 128 can comprise a non-transitory storage medium described above. The storage device 128 may include a solid-state drive (SSD), a hard disk drive (HDD), a floppy disk drive, flash memory, an optical disc, a magneto-optical disc, magnetic tape, a Universal Serial Bus (USB) drive or a combination of two or more of these. The storage device 128 may include removable or non-removable (or fixed) media, where appropriate. The storage device 128 may be internal or external to the control system 116. In one or more embodiments, the storage device 128 is non-volatile, solid-state memory. In other embodiments, the storage device 128 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The user interface 130 allows a user to provide input to, receive output from, and otherwise transfer data to and receive data from control system 116. The user interface 130 may include a mouse, a keypad or a keyboard, a touch screen, a camera, an optical scanner, network interface, modem, other known user devices or a combination of such user interfaces. The user interface 130 may include one or more devices for presenting output to a user, including, but not limited to, a graphics engine, a display (e.g., a display screen), one or more output drivers (e.g., display drivers), one or more audio speakers, and one or more audio drivers. In certain embodiments, the user interface 130 is configured to provide graphical data to a display for presentation to a user. The graphical data may be representative of one or more graphical user interfaces and/or any other graphical content as may serve a particular implementation.

The communication interface 132 may include hardware, software, or both. In any event, the communication interface 132 is configured to provide one or more interfaces for communication (such as, for example, packet-based communication) between the control system 116 and one or more other computing devices or networks. As an example and not by way of limitation, the communication interface 132 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 132 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 132 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 132 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), user Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 134 may include hardware, software, or both that couples components of the control system 116 to each other. As an example and not by way of limitation, the communication infrastructure 134 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Embodiments of the disclosure further include:

Embodiment 1. A sensor assembly for determining an operating characteristic of a nuclear reactor, comprising: a solid-state lasing media doped with at least one of a fissile species or a non-fissile species and configured to be disposed within a core of the nuclear reactor; and an optical fiber operably coupled to the solid-state lasing media and configured to extend out of the core of the nuclear reactor and to control system of the nuclear reactor.

Embodiment 2. The sensor assembly of embodiment 1, wherein the fissile species comprises one or more of uranium, plutonium, americium, or californium.

Embodiment 3. The sensor assembly of any one of embodiments 1 and 2, further comprising: a full-mirror coating partially surrounding the solid-state lasing media; a two-way mirror coating disposed on a longitudinal end of the solid-state lasing media; an interface portion coupling the two-way mirror coating to the optical fiber; and a casing surrounding the full-mirror coating and at least a portion of the interface portion.

Embodiment 4. The sensor assembly of any one of embodiments 1-3, wherein the solid-state lasing media comprises one or more of a garnet, a sapphire, a ruby, or an emerald.

Embodiment 5. The sensor assembly of any one of embodiments 1-4, wherein the solid-state lasing media comprises a cylindrical shape.

Embodiment 6. The sensor assembly of any one of embodiments 1-5, wherein the solid-state lasing media comprises an yttrium aluminum garnet.

Embodiment 7. The sensor assembly of any one of embodiments 1-3, wherein the fissile species is excitable in response to radiation to pumps a laser light through the optical fiber.

Embodiment 8. A nuclear reactor system, comprising: a reactor vessel defining a reactor core; a control system for operating the nuclear reactor system and disposed outside of the reactor core; and at least one sensor assembly partially disposed within the reactor core, the at least one sensor assembly comprising: at least one solid-state lasing media doped with a fissile species and disposed within the reactor core of the nuclear reactor system; and at least one optical fiber operably coupled to the at least one solid-state lasing media and extending out of the reactor core of the nuclear reactor system and operably coupled control system of the nuclear reactor.

Embodiment 9. The nuclear reactor system of embodiment 8, wherein the at least one sensor assembly comprises a plurality of sensor assemblies distributed throughout the reactor core of the nuclear reactor system.

Embodiment 10. The nuclear reactor system of any one of embodiments 8 and 9, wherein the at least one sensor assembly comprises a plurality of solid-state lasing media and a plurality of optical fibers.

Embodiment 11. The nuclear reactor system of embodiment 10, wherein each of the solid-state lasing media of the plurality of solid-state lasing media is doped with a different fissile species.

Embodiment 12. The nuclear reactor system of any one of embodiments 8-11, wherein the fissile species comprises one or more of uranium, plutonium, americium, or californium.

Embodiment 13. The nuclear reactor system of any one of embodiments 8-12, wherein the solid-state lasing media comprises one or more of a garnet, a sapphire, a ruby, or an emerald.

Embodiment 14. The nuclear reactor system of any one of embodiments 8-13, wherein the fissile species is excitable in response to radiation to pump a laser light through the at least one optical fiber.

Embodiment 15. The nuclear reactor system of any one of embodiments 8-14, wherein the control system comprises: at least one additional processor; and at least one additional non-transitory computer-readable storage medium storing instructions thereon that, when executed by the at least one additional processor, cause control system to: receive from the at least one solid-state lasing media and through the at least one optical fiber a laser light; analyze the laser light; and via the analysis of the laser light, determine at least one operating characteristic of the nuclear reactor system.

Embodiment 16. The nuclear reactor system of embodiment 15, wherein the at least one operating characteristic comprises one or more of a reactor power, an internal neutron flux, a gamma flux, a beta flux, or an external radiation flux.

Embodiment 17. A method of determining an operating characteristic of a nuclear reactor, comprising: disposing at least one sensor assembly within a nuclear reactor, the at least one sensor assembly comprising: a solid-state lasing media disposed within a reactor core; and an optical fiber coupled to the solid-state lasing media and extending out of the reactor core; and during operation of the nuclear reactor; receiving from the optical fiber a laser light: analyzing the laser light; and based at least in part on the analysis of the laser light, determining the operating characteristic of the nuclear reactor.

Embodiment 18. The method of embodiment 17, wherein the operating characteristic comprises one or more of a reactor power, an internal neutron flux, a gamma flux, a beta flux, or an external radiation flux.

Embodiment 19. The method of any one of embodiments 17 and 18, wherein the laser light is pumped by nuclear reactor.

Embodiment 20. The method of any one of embodiments 17-19, further comprising, in response to determining the operating characteristic of the nuclear reactor, adjusting an operating parameter of the nuclear reactor in real time.

Embodiment 21. The method of any one of embodiments 17-20, further comprising: causing a fissile species of the solid-state lasing media to undergo nuclear fission via interaction with a neutron flux produced in the nuclear reactor; and pumping, via fission fractions generated via the nuclear fission, directly through kinetic energy or indirectly through thermal excitation, the laser light through the optical fiber.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A sensor assembly for determining operating characteristics of a nuclear reactor, comprising:
a plurality of solid-state lasing media, each of the plurality of solid-state lasing media doped with a dopant, at least one dopant of the plurality of solid-state lasing media comprising at least one fissile species, each of the plurality of solid-state lasing media configured to be disposed within a core of the nuclear reactor and configured to output laser light, and at least one solid-state lasing media of the plurality of solid-state lasing media being doped with a different dopant formulated to enable determination of a different energy spectrum of the nuclear reactor than another solid-state lasing media of the plurality of solid-state lasing media; and
at least one optical fiber operably coupled to the plurality of solid-state lasing media and configured to receive the laser light generated by the plurality of solid-state lasing media, the at least one optical fiber configured to extend out of the core of the nuclear reactor to a control system of the nuclear reactor.

2. The sensor assembly of claim 1, wherein the at least one fissile species includes at least one species chosen from among a fissile material and a fissionable material and the at least one fissile species comprises one or more of uranium, plutonium, americium, or californium.

3. The sensor assembly of claim 1, further comprising:
a full-mirror coating partially surrounding the plurality of solid-state lasing media;
a two-way mirror coating disposed on a longitudinal end of the plurality of solid-state lasing media;
an interface portion coupling the two-way mirror coating to the at least one optical fiber; and
a casing surrounding the full-mirror coating and at least a portion of the interface portion.

4. The sensor assembly of claim 1, wherein the plurality of solid-state lasing media comprises one or more of a garnet, a sapphire, a ruby, or an emerald.

5. The sensor assembly of claim 1, wherein the plurality of solid-state lasing media comprises a cylindrical shape.

6. The sensor assembly of claim 1, wherein the at least one fissile species is excitable in response to radiation to generate the laser light and direct the laser light to the at least one optical fiber.

7. The sensor assembly of claim 1, wherein each of the plurality of solid-state lasing media is configured to generate a respective laser light with a different wavelength responsive to the different energy spectrum.

8. A nuclear reactor system, comprising:
a reactor vessel defining a reactor core;
a control system for operating components of the nuclear reactor system, the control system disposed outside of the reactor core; and
at least one sensor assembly partially disposed within the reactor core, the at least one sensor assembly comprising:
a plurality of solid-state lasing media doped with a dopant comprising a fissile species, disposed within the reactor core of the nuclear reactor system, and configured to generate laser light, an output of the laser light based at least in part on the fissile species, each of the plurality of solid-state lasing media doped with a different fissile species; and
at least one optical fiber operably coupled to the plurality of solid-state lasing media, extending from the plurality of solid-state lasing media out of the reactor core of the nuclear reactor system, operably coupled to the control system, and configured to receive laser light from the plurality of solid-state lasing media.

9. The nuclear reactor system of claim 8, wherein the at least one sensor assembly comprises a plurality of sensor assemblies distributed throughout the reactor core of the nuclear reactor system.

10. The nuclear reactor system of claim 8, wherein the at least one sensor assembly comprises a plurality of optical fibers.

11. The nuclear reactor system of claim 8, wherein the fissile species includes at least one species chosen from among a fissile material and a fissionable material and the fissile species comprises one or more of uranium, plutonium, americium, or californium.

12. The nuclear reactor system of claim 8, wherein the plurality of solid-state lasing media comprises one or more of a garnet, a sapphire, a ruby, or an emerald.

13. The nuclear reactor system of claim 8, wherein the fissile species is excitable in response to radiation to pump a portion of the plurality of solid-state lasing media to generate the laser light and direct the laser light to the at least one optical fiber, and wherein the at least one optical fiber transmits the laser light out of the reactor core.

14. The nuclear reactor system of claim 8, wherein the control system comprises:
at least one processor; and
at least one non-transitory computer-readable storage medium storing instructions thereon that, when executed by the at least one processor, cause the control system to:
receive from the plurality of solid-state lasing media and through the at least one optical fiber, laser light;
analyze the laser light; and
via the analysis of the laser light, determine at least one operating characteristic of the nuclear reactor system.

15. The nuclear reactor system of claim 14, wherein the at least one operating characteristic comprises one or more of a reactor power, an internal neutron flux, a gamma flux, a beta flux, or a radiation flux external to the reactor core.

16. A method of determining operating characteristics of a nuclear reactor, comprising:
disposing at least one sensor assembly within a nuclear reactor, the at least one sensor assembly comprising:
a plurality of solid-state lasing media, each of the plurality of solid-state lasing media doped with a dopant, at least one dopant of the plurality of solid-state lasing media comprising at least one fissile species, each of the plurality of solid-state lasing media disposed within a reactor core and configured to generate laser light, and at least one solid-state lasing media of the plurality of solid-state lasing media being doped with a different dopant formulated to enable determination of a different energy spectrum of the nuclear reactor than another solid-state lasing media of the plurality of solid-state lasing media; and
at least one optical fiber operably coupled to the plurality of solid-state lasing media and extending from the plurality of solid-state lasing media out of the reactor core to a control system of the nuclear reactor, the at least one optical fiber configured to receive the laser light from the plurality of solid-state lasing media; and during operation of the nuclear reactor:
    receiving from the at least one optical fiber, the laser light;
    analyzing the laser light; and
    based at least in part on the analysis of the laser light, determining at least one operating characteristic of the nuclear reactor.

17. The method of claim 16, wherein determining at least one operating characteristic comprises determining one or more of a reactor power, an internal neutron flux, a gamma flux, a beta flux, or a radiation flux external to the nuclear reactor.

18. The method of claim 16, wherein a portion of each of the plurality of solid-state lasing media is pumped by a respective reaction of the nuclear reactor to generate the laser light.

19. The method of claim 16, further comprising, in response to determining at least one operating characteristic of the nuclear reactor, adjusting an operating parameter of the nuclear reactor in real time, the adjustment being at least partially based on the laser light received.

20. The method of claim 16, further comprising:
    causing the at least one fissile species to undergo nuclear fission via interaction with a neutron flux produced in the nuclear reactor;
    pumping, via fission fractions generated via the nuclear fission, directly through kinetic energy or indirectly through thermal excitation, a portion of a respective solid-state lasing media of the plurality of solid-state lasing media to generate the laser light and direct the laser light at the at least one optical fiber; and
    directing the laser light out of the nuclear reactor with the at least one optical fiber.

21. The method of claim 16, wherein each of the plurality of solid-state lasing media is configured to generate a respective laser light with a different wavelength responsive to the different energy spectrum.

\* \* \* \* \*